May 8, 1951 N. L. SMITH 2,551,770
COMBINED OIL MEASURING GAUGE AND
HEATER FOR MOTOR VEHICLES
Filed Nov. 16, 1948
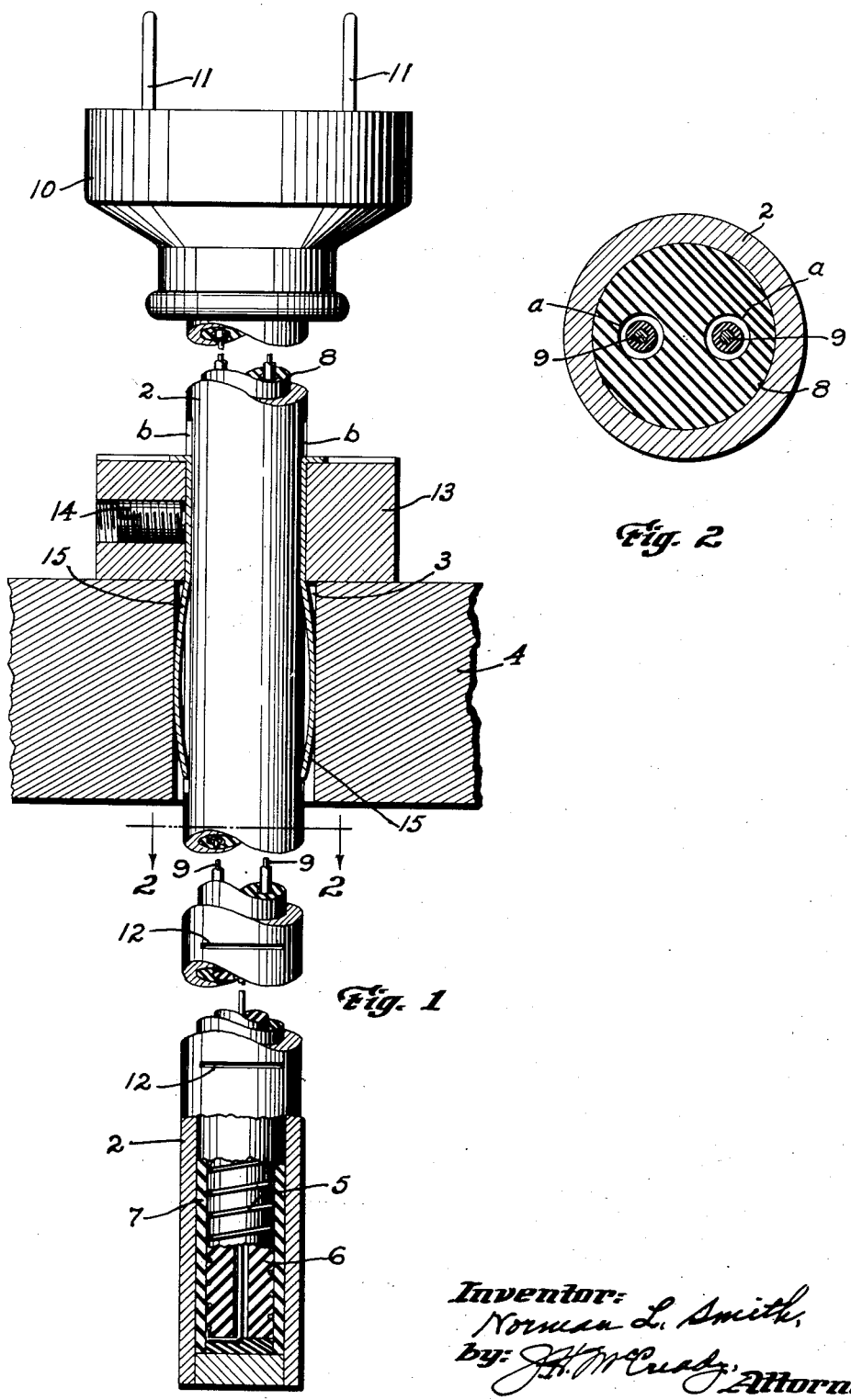

Patented May 8, 1951

2,551,770

UNITED STATES PATENT OFFICE 2,551,770

COMBINED OIL MEASURING GAUGE AND HEATER FOR MOTOR VEHICLES

Norman L. Smith, Malden, Mass.

Application November 16, 1948, Serial No. 60,268

5 Claims. (Cl. 219—38)

In very cold weather the increased viscosity of the cylinder oil in the crank case of a motor vehicle is an important reason for greater difficulty commonly experienced in starting such vehicles under these conditions. It increases the load on the starting motor and, consequently, places a very heavy drain on the battery. These facts have long been recognized and many expedients have been suggested for heating the oil in some manner to minimize this difficulty. Those with which I am familiar have been so expensive or have required so much time in using them, that they have not been widely accepted.

The present invention aims to devise means for avoiding both of these objections without requiring any modification of the crank case, or any other part of the automobile, in order to install or use the invention.

The nature of the invention will be readily understood from the following description when read in connection with the accompanying drawing, and the novel features will be particularly pointed out in the appended claims.

In the drawings,

Fig. 1 is a view, partly in front elevation and partly in vertical section, illustrating a device embodying the present invention; and Fig. 2 is a sectional view on a larger scale taken substantially on the line 2—2, Fig. 1.

Practically any gasolene driven motor vehicle today is equipped with an oil measuring stick inserted through a vertical hole in the crank case at one side of the cylinder block. The function of this stick is to measure the level of the oil in the crank case. The present invention combines an electric heater with the measuring stick so that it not only performs its normal functions but, in addition, serves to warm up the oil in the crank case and therefore to facilitate starting.

Referring to the drawings, the measuring stick there shown comprises a tubular metal shell 2 closed at its lower end and of such diameter as to slide freely through the hole 3 provided in the flange 4 of the cylinder block to receive this device. According to the present invention an electric heating coil 5 is wound on a supporting core 6 of insulation and is positioned in the lower end portion of the metal tube or shell 2. An insulating sleeve 7 of asbestos, or any equivalent material, encircles the heating unit and insulates it from the metal shell. For manufacturing purposes it is found convenient to make the core 6 in a relatively short unit, say four or five inches long, to encircle this unit with the sleeve 7, and then to place a second insulator 8 into the tube 2 above the heating unit, this member 8 having two holes a—a through it lengthwise to accommodate the lead wires 9—9 which carry current to and from the coil 5. A head 10, consisting of a standard connector member of the plug and socket type, is secured to the upper end portion of the tube 2 and carries terminal blades 11—11 to which the lead wires 9—9 are connected.

In producing this device the parts are manufactured independently, the coil 5 is wound on the core 6, the sleeve 7 is slipped over the coil and its core 6, the lead wires 9—9 are run through the insulator 8, and all of the parts just mentioned are then slipped into the tube or shell 2, after which the lead wires are made fast to the terminals 11—11. During the manufacture of the tube 2 suitable oil gauging marks, such as those shown at 12, are stamped into it.

Some means should be provided for limiting the depth to which the measuring stick can be inserted in the crank case and this object is accomplished by mounting a collar 13 on the tube and securing it in any desired position of adjustment thereon by means of the set screw 14. Preferably this collar has two spring blades 15 secured to it and lying vertically in grooves b on opposite sides of the tube 2, these blades serving to support the measuring stick against rattling.

When it is desired to use the device to warm up the cylinder oil, a conductor connected to any convenient source of power and equipped with a socket member to fit the blades of the head 10 are connected with it, thus producing a flow of current through the heating coil 5 which, in a short time, warms up the surrounding oil sufficiently to make the matter of starting very much easier. It not only reduces the time required for this purpose, but it also lessens very materially the drain on the battery and the service required of the starting motor. In determining the depth of oil in the crank case, the device may be used in the same manner that the ordinary oil stick is employed. The graduation or depth marks 12 are useful at this time, although for roughly measuring the quantity of oil in the crank case, particularly for a man who is used to his own motor, no graduations at all are actually necessary. They are required, however, for accurate measurement.

While the wattage which the device is designed to carry may be varied within considerable limits, I have found that from forty to sixty watts satisfies the requirements of the average automobile user very satisfactorily.

While I have herein shown and described a preferred embodiment of my invention, it will be evident that the invention is susceptible of embodiment in somewhat different forms without departing from the spirit or scope thereof.

Having thus described my invention, what I desire to claim as new is:

1. A combined oil measuring stick and electric heater for the crank cases of motor vehicles comprising a metal tube closed at its lower end, the outer side of the tube having a surface adapted to indicate an oil level thereon, an electric heating element in the lower part of said tube, conductors running from said element up inside said tube, and means insulating said element and said conductors from said tube, said tube having an outside diameter sufficiently small to pass through the hole provided in the crank cases of automobiles to receive the oil measuring stick.

2. An article according to preceding claim 1, including a head fast on the upper end of said tube and having terminals connected with said conductors and arranged to fit a conventional electric cord connector.

3. An article according to preceding claim 1, in which said insulating means includes a rigid insulating core slidable into and out of said tube, having passages in which said conductors are housed and supported in spaced relation from each other.

4. An article according to preceding claim 1, in combination with a collar encircling said tube and serving as a stop to predetermine the depth to which the tube may be inserted in the crank case, and means for securing said collar to said tube in various positions of adjustment thereon.

5. An article according to preceding claim 1, in which said tube has oil depth indications on its outer surface.

NORMAN L. SMITH.

REFERENCES CITED

The following references are of record in the file of this patent:

UNITED STATES PATENTS

| Number | Name | Date |
|---|---|---|
| 1,858,003 | Downey | May 10, 1932 |
| 1,894,887 | Pingrey | Jan. 17, 1933 |
| 1,994,119 | Weatherby | Mar. 12, 1935 |
| 2,354,061 | Richardson | July 18, 1944 |
| 2,389,925 | Morgan et al. | Nov. 27, 1945 |